(12) United States Patent
Park et al.

(10) Patent No.: US 10,393,192 B2
(45) Date of Patent: Aug. 27, 2019

(54) CLUTCH

(71) Applicant: Hyundai Motor Company, Seoul (KR)

(72) Inventors: Jong Yun Park, Hwaseong-si (KR); Yeon Ho Kim, Suwon-si (KR); Sung Wha Hong, Hwaseong-si (KR); Kyung Ha Kim, Yongin-si (KR); Jae Young Choi, Busan (KR)

(73) Assignee: Hyundai Motor Company, Seoul (KR)

( * ) Notice: Subject to any disclaimer, the term of this patent is extended or adjusted under 35 U.S.C. 154(b) by 114 days.

(21) Appl. No.: 15/588,922

(22) Filed: May 8, 2017

(65) Prior Publication Data

US 2018/0142740 A1 May 24, 2018

(30) Foreign Application Priority Data

Nov. 24, 2016 (KR) .................... 10-2016-0157623

(51) Int. Cl.
*F16D 23/04* (2006.01)
*F16D 23/06* (2006.01)

(52) U.S. Cl.
CPC ........ *F16D 23/04* (2013.01); *F16D 2023/065* (2013.01); *F16D 2023/0618* (2013.01); *F16D 2023/0681* (2013.01)

(58) Field of Classification Search
CPC .................. F16D 13/34; F16D 13/28
See application file for complete search history.

(56) References Cited

U.S. PATENT DOCUMENTS

| 2,410,511 | A | * | 11/1946 | Letsinger | F16D 23/06 192/53.31 |
|---|---|---|---|---|---|
| 4,732,247 | A | * | 3/1988 | Frost | F16D 23/06 192/53.31 |
| 5,544,727 | A | * | 8/1996 | Braun | F16D 23/06 192/48.91 |
| 8,469,168 | B2 | * | 6/2013 | Park | F16D 23/06 192/53.361 |
| 2007/0029155 | A1 | * | 2/2007 | Hiraiwa | F16D 23/025 192/53.31 |
| 2018/0058515 | A1 | * | 3/2018 | Christoffer | F16D 23/025 |

FOREIGN PATENT DOCUMENTS

FR   2949833        * 9/2009
KR   10-2007-0107610 A  11/2007

* cited by examiner

*Primary Examiner* — Mark A Manley
(74) *Attorney, Agent, or Firm* — Morgan, Lewis & Bockius LLP (57) ABSTRACT

A clutch may include a hub configured to be constrained to a rotation shaft; a sleeve configured to be straight slidably disposed on an external circumferential surface of the hub; a clutch gear configured to be disposed to be relatively rotatable with respect to the rotation shaft; a first friction ring configured to be mounted between the clutch gear and the hub; a key configured to be mounted between the sleeve and the hub; and a displacement changing portion configured to change a relative rotation displacement of the first friction ring with respect to the hub to an axial linear displacement of the first friction ring.

7 Claims, 7 Drawing Sheets

CLUTCH

CROSS REFERENCE TO RELATED APPLICATION

The present application claims priority to Korean Patent Application No. 10-2016-0157623, filed on Nov. 24, 2016, the entire contents of which is incorporated herein for all purposes by this reference.

BACKGROUND OF THE INVENTION

Field of the Invention

The present invention relates to a clutch, and more particularly, to a clutch technology capable of being used in a vehicle transmission, or the like.

Description of Related Art

A vehicle transmission, etc. use a plurality of clutches to be able to control a power transfer between rotating bodies relatively rotated to each other.

The above-mentioned clutch preferably has large torque transfer capacity when possible while occupying as small a volume as possible, but the volume of the clutch is increased to secure the large torque transfer capacity.

Further, for the clutch to transfer a large torque, a force to operate the clutch is increased and therefore an apparatus for operating the clutch, for example, a size of an actuator, or the like needs to be relatively increased.

Further, in the case of the clutch used in the vehicle transmission, the control of the clutch transfer torque has a big effect on transmission quality of a vehicle, and therefore it is preferable to precisely control the clutch transfer torque by the actuator.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch configured for making the size of a clutch system as small as possible, transferring a relatively large torque, and very precisely controlling a clutch transfer torque by an actuator by occupying a relatively small volume and implementing relatively larger torque transfer capacity due to a simple and compact structure and relatively reducing an actuating force of the clutch required for the torque transfer to reduce a size and capacity of the actuator.

According to an exemplary embodiment of the present invention, there is provided a clutch including: a hub configured to be constrained to a rotation shaft; a sleeve configured to be straight slidably disposed on an external circumferential surface of the hub; a clutch gear configured to be disposed to be relatively rotatable with respect to the rotation shaft; a first friction ring configured to be disposed between the clutch gear and the hub and pressed toward the clutch gear to form a frictional force between the clutch gear and the hub to transfer a torque; a key configured to be disposed between the sleeve and the hub and transfer a linear displacement of the sleeve to the first friction ring before the sleeve is straight slid toward the clutch gear to contact the first friction ring; and a displacement changing portion configured to change a relative rotation displacement of the first friction ring with respect to the hub to an axial linear displacement of the first friction ring.

The hub may include a hub groove forming the displacement changing portion while accommodating the key, the first friction ring may include a first ring protrusion forming the displacement changing portion while being inserted into the hub groove, and an internal side of the sleeve may include a sleeve protrusion inserted into the hub groove to press the first ring protrusion axially.

The displacement changing portion may include: a first inclined surface formed at an end part toward the first friction ring of the hub groove in a shape in which a width thereof is gradually expanded along a circumferential direction of the hub groove; and a second inclined surface formed at the first ring protrusion of the first friction ring in parallel with the first inclined surface.

The key may include: a support ball elastically supported toward the sleeve protrusion of the sleeve; and a key spring embedded to give an elastic force to the support ball, and at an internal side of the sleeve protrusion may be provided with a sleeve groove so that a part of the support ball of the key is inserted into the sleeve groove.

The clutch gear may include a clutch cone that has the external diameter gradually decreased while protruding toward the hub and a plurality of middle friction members may be included between the first friction ring and the clutch cone so that a plurality of friction surfaces are formed to overlap each other.

The plurality of middle friction members may include: a second friction ring configured to have a limited rotation with respect to the hub and have an internal side contacting an external side of the clutch cone; and a middle cone configured to have a limited rotation with respect to the clutch gear and have an internal side formed to contact an external side of the second friction ring and an external side formed to contact the internal side of the first friction ring.

The second friction ring may include a plurality of second ring protrusions protruding toward the hub and the hub may include a plurality of hub holes into which the second ring protrusions are inserted.

The clutch gear may include a structure in which a center of the clutch gear is provided with a flange portion, an opposite side of the hub is provided with a gear portion based on the flange portion, and the hub is provided with the clutch cone based on the flange portion.

The middle cone may include a plurality of middle cone protrusions protruding toward the flange portion and the flange portion may be provided with a plurality of flange holes into which the middle cone protrusions are inserted.

The methods and apparatuses of the present invention have other features and advantages which will be apparent from or are set for in more detail in the accompanying drawings, which are incorporated herein, and the following Detailed Description, which together server to explain certain principles of the present invention.

It should be understood that the appended drawings are not necessarily to scale, present a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will not be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 through FIG. 5, a clutch according to an exemplary embodiment of the present invention may include a hub 1 configured to be constrained to a rotation shaft; a sleeve 3 configured to be straight slidably disposed on an external circumferential surface of the hub 1; a clutch gear 5 configured to be disposed to be relatively rotatable with respect to the rotation shaft; a first friction ring 7 configured to be disposed between the clutch gear 5 and the hub 1 and pressed toward the clutch gear 5 to form a frictional force between the clutch gear 5 and the hub 1 to transfer a torque; a key 9 configured to be disposed between the sleeve 3 and the hub 1 and transfer a linear displacement of the sleeve 3 to the first friction ring 7 before the sleeve 3 is straight slid toward the clutch gear 5 to contact the first friction ring 7; and a displacement changing portion configured to change a relative rotation displacement of the first friction ring 7 with respect to the hub 1 to an axial linear displacement of the first friction ring 7.

Here, the rotation shaft is fastened by penetrating through the hub and the clutch gear 5 and the axial direction means a longitudinal direction of the rotation shaft, that is, a direction of a rotation central axis of the hub 1 and the clutch gear 5.

A clutch 11 according to an exemplary embodiment of the present invention is configured to control the torque transferred between the hub 1 and the clutch gear 5 by the operation of the sleeve 3 depending on an axial direction, and The key 9 removes a gap, an oil film or the like between the first friction ring 7 and the clutch gear 5 before the sleeve 3 directly presses the first friction ring 7 to generate the substantial frictional force for the torque transfer to determine a size of the transfer torque through the clutch 11 in response to a force from the actuator applied to the sleeve 3 when the sleeve 3 directly presses the first friction ring 7, precisely controlling the clutch transfer torque by the control of the actuator.

The hub 1 includes a hub groove 13 forming the displacement changing portion while accommodating the key 9, the first friction ring 7 includes a first ring protrusion 15 forming the displacement changing portion while being inserted into the hub groove 13, and an internal side of the sleeve 3 includes a sleeve protrusion 17 inserted into the hub groove 13 to press the first ring protrusion 15 axially.

The key includes a support ball 19 elastically supported toward the sleeve protrusion 17 of the sleeve 3, a key spring 21 embedded to give an elastic force to the support ball 19, and an internal side of the sleeve protrusion 17 includes a sleeve groove 23 so that a portion of the support ball 19 of the key 9 is inserted into the sleeve groove 23.

Figure 1:
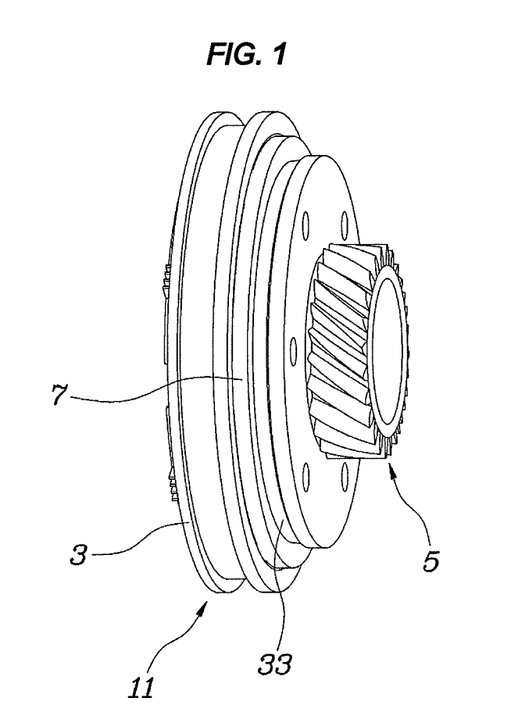
FIG. 1 is a diagram illustrating a clutch according to an exemplary embodiment of the present invention.
Figure 2:
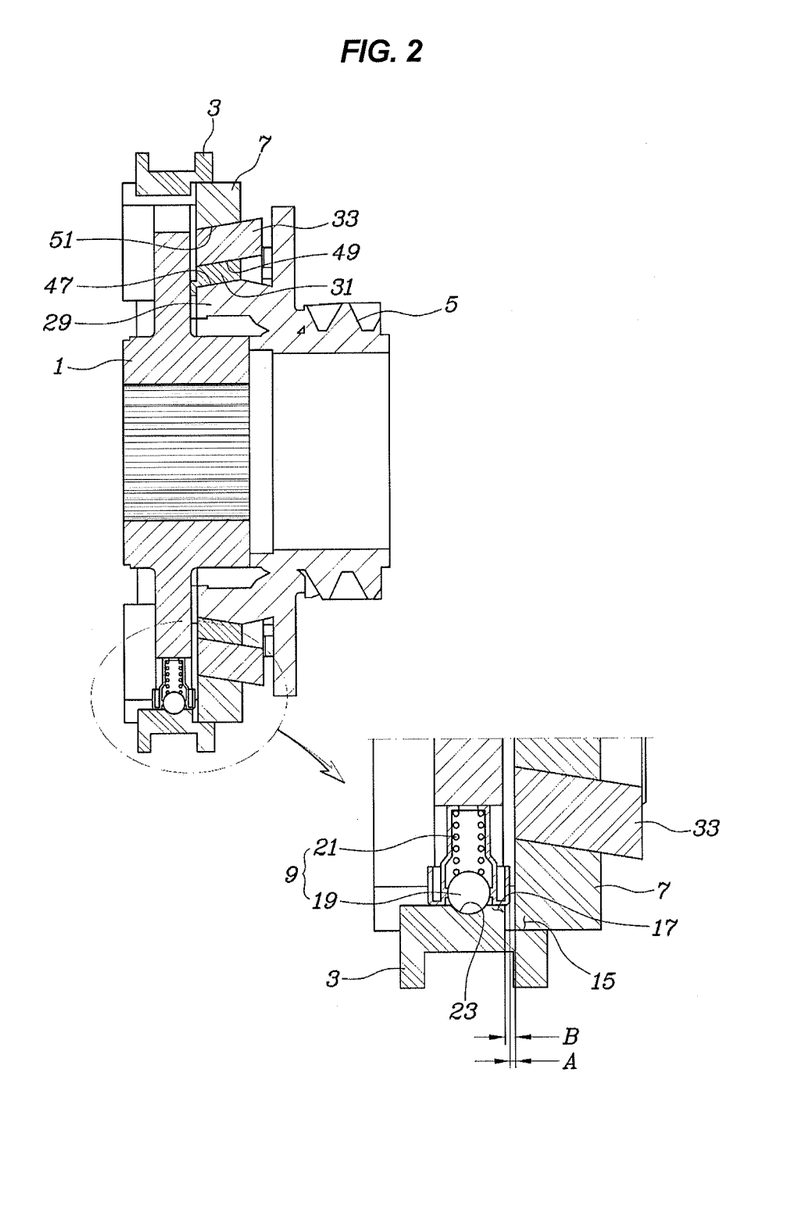
FIG. 2 is a cross-sectional view of the clutch of FIG. 1 taken along an axial direction.
Figure 3:
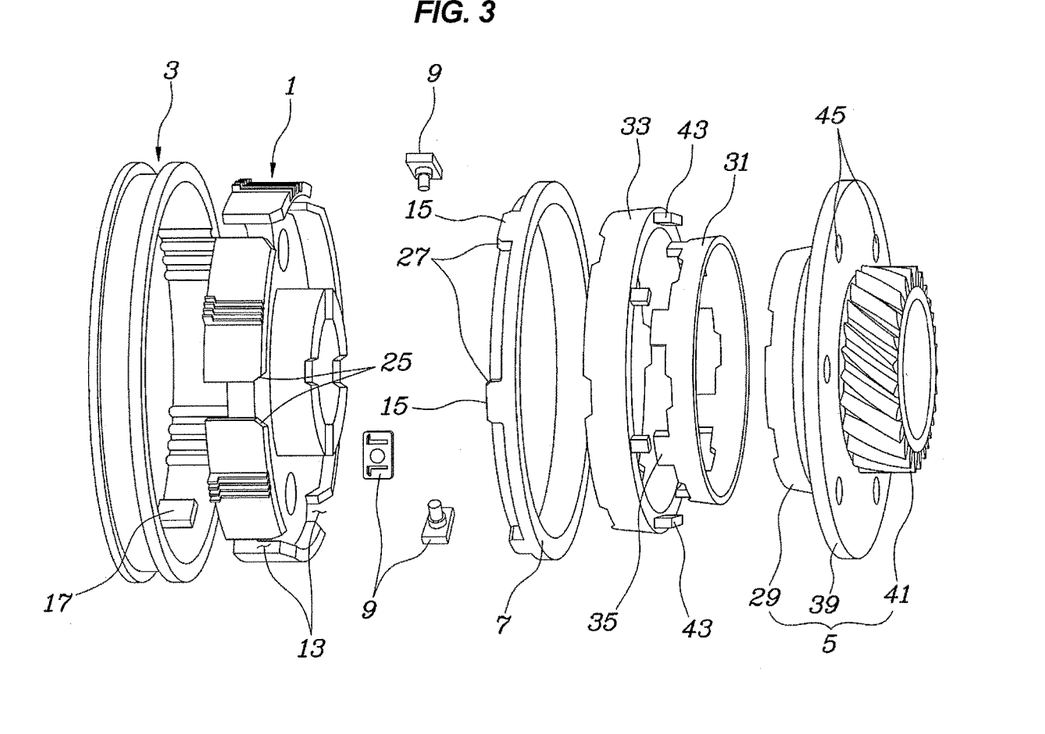
FIG. 3 is an exploded perspective view of the clutch of FIG. 1.

That is, the support ball 19 of the key 9 is elastically supported within the hub groove 13 in the state in which it is inserted into the sleeve groove 23 of the sleeve protrusion 17 by the key spring 21, and as can be appreciated from FIG. 2, a gap A between the key 9 and the first friction ring 7 is smaller than a gap B between the sleeve 3 and the first friction ring 7 at a predetermined position where the sleeve 3 never moves toward the clutch gear 5 and thus the key 9 starts to first press the first friction ring 7 in the initial stage in which the sleeve 3 moves toward the clutch gear 5 and as a repulsive force applied to the key 9 from the first friction ring 7 is increased, the sleeve 3 moves while pushing the support ball 19 toward an internal side of the key 9 to directly press the first friction ring 7.

Therefore, when the actuator is actuated to straight move the sleeve 3, the key 9 presses the first friction ring 7 earlier than the sleeve 3 to remove the gap, the oil film, etc. present between the first friction ring 7 and the clutch gear 5, and then when the sleeve 3 directly presses the first friction ring 7, the size of the transfer torque through the clutch 11 may be accurately determined in response to the force from the actuator applied to the sleeve in the state in which the effect due to the gap, the oil film, etc. is excluded.

The displacement changing portion is configured to include a first inclined surface 25 formed at an end part toward the first friction ring 7 of the hub groove 13 in a shape in which a width thereof is gradually expanded along a circumferential direction of the hub groove 13 and a second inclined surface 27 formed at the first ring protrusion 15 of the first friction ring 7 in parallel with the first inclined surface 25.

Therefore, when the first friction ring 7 is pressed toward the clutch gear 5 to start to generate a frictional force between it and the clutch gear 5, a relative rotation displacement is generated with respect to the hub 1 and when the first inclined surface 25 of the hub groove 13 contacts the second inclined surface 27 of the first ring protrusion 15 by the rotation displacement, the rotation displacement generates an axial displacement of the first friction ring 7 to more press the first friction ring 7 toward the clutch gear 5 to generate a larger frictional force between the first friction ring 7 and the clutch gear 5. Therefore, describing it based on the same size of transfer torque through the clutch 11, it is possible to form the same level of clutch transfer torque even when the relatively smaller actuator force is used.

Consequently, the displacement changing portion formed at the hub 1 and the first friction ring 7 are configured to make the capacity of the actuator, which needs to be provided to straight move the sleeve 3, relatively small and secure the larger torque transfer capacity through the clutch 11.

The clutch gear 5 includes a clutch cone 29 that has the external diameter gradually decreased while protruding toward the hub 1 and a plurality of middle friction members are provided between the first friction ring 7 and the clutch cone 29 so that a plurality of friction surfaces are formed to overlap each other, wherein the clutch forms an overall wide friction surface while occupying the relatively smaller space, securing a larger torque transfer capacity through the clutch 11.

According to the present exemplary embodiment, the plurality of middle friction members are configured to include a second friction ring 31 having a limited rotation with respect to the hub 1 and having an internal side contacting an external side of the clutch cone 29 and a middle cone 33 having a limited rotation with respect to the clutch gear 5 and having an internal side formed to contact an external side of the second friction ring 31 and an external side formed to contact the internal side of the first friction ring 7.

The second friction ring 31 includes a plurality of second ring protrusions 35 protruding toward the hub 1 and the hub 1 includes a plurality of hub holes into which the second ring protrusions 35 are inserted, wherein the second ring protrusions 35 of the second friction ring 31 are inserted into the hub holes 37 of the hub 1, constraining the relative rotation with respect to the hub 1.

The clutch gear 5 has a structure in which a center thereof includes a flange portion 39, an opposite side of the hub 1 includes a gear portion 41 based on the flange portion 39, and the hub 1 includes the clutch cone 29 based on the flange portion 39, and has a structure in which the gear portion 41 is meshed with other gears to transfer a torque transferred through the clutch 11.

The middle cone 33 is provided with a plurality of middle cone protrusions 43 protruding toward the flange portion 39 and the flange portion 39 includes a plurality of flange holes 45 into which the middle cone protrusions 43 are inserted to allow the middle cone protrusions 43 of the middle cone 33 to be inserted into the flange hole 45, wherein the rotation of the middle cone 33 is constrained with respect to the clutch gear 5.

Therefore, by a first friction surface 47 formed by the clutch cone 29 and the second friction ring 31, a second friction surface 49 formed by the second friction ring 31 and the clutch cone 29, and a third friction surface 51 formed by the clutch cone 29 and the first friction ring 7, the entire friction surface for the torque transfer of the clutch 11 is formed between the hub 1 and the clutch gear 5 to serve to transfer a torque between the hub 1 and the clutch gear 5.

Figure 4:
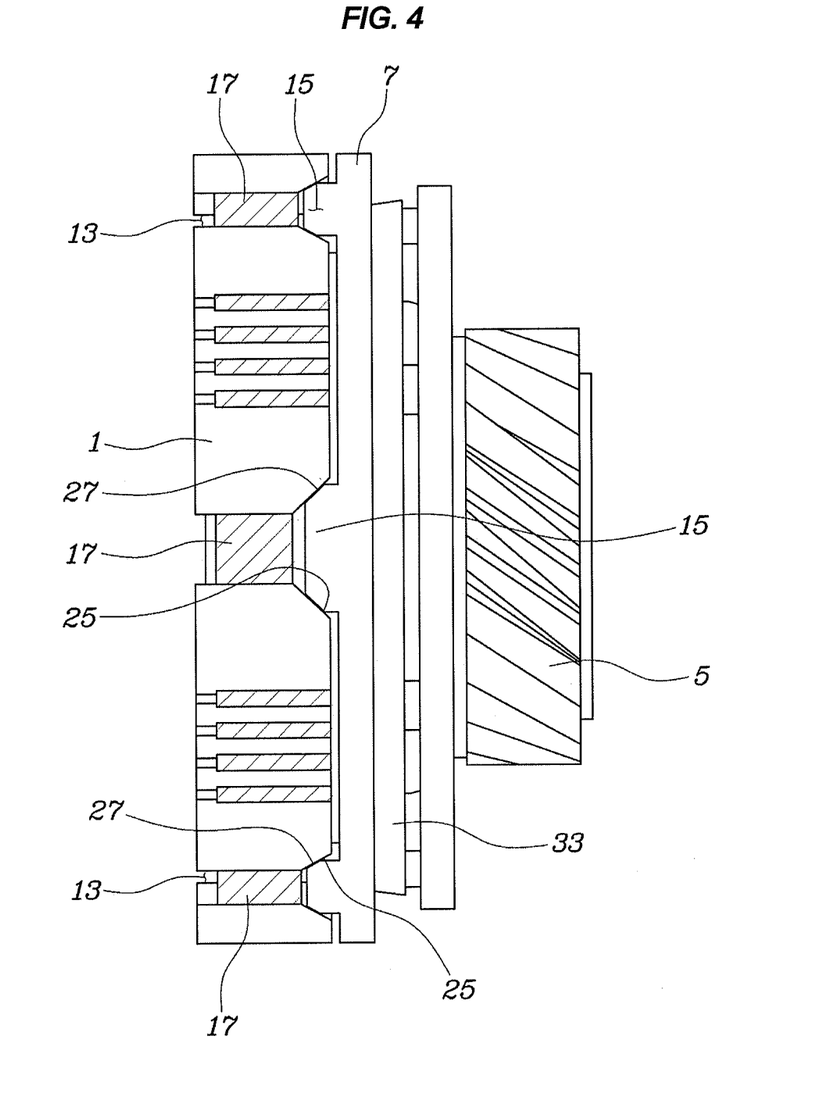
FIG. 4 is a diagram illustrating a state in which an external sleeve is removed from the clutch of FIG. 1 based on an interface between a hub and a sleeve.
Figure 5:
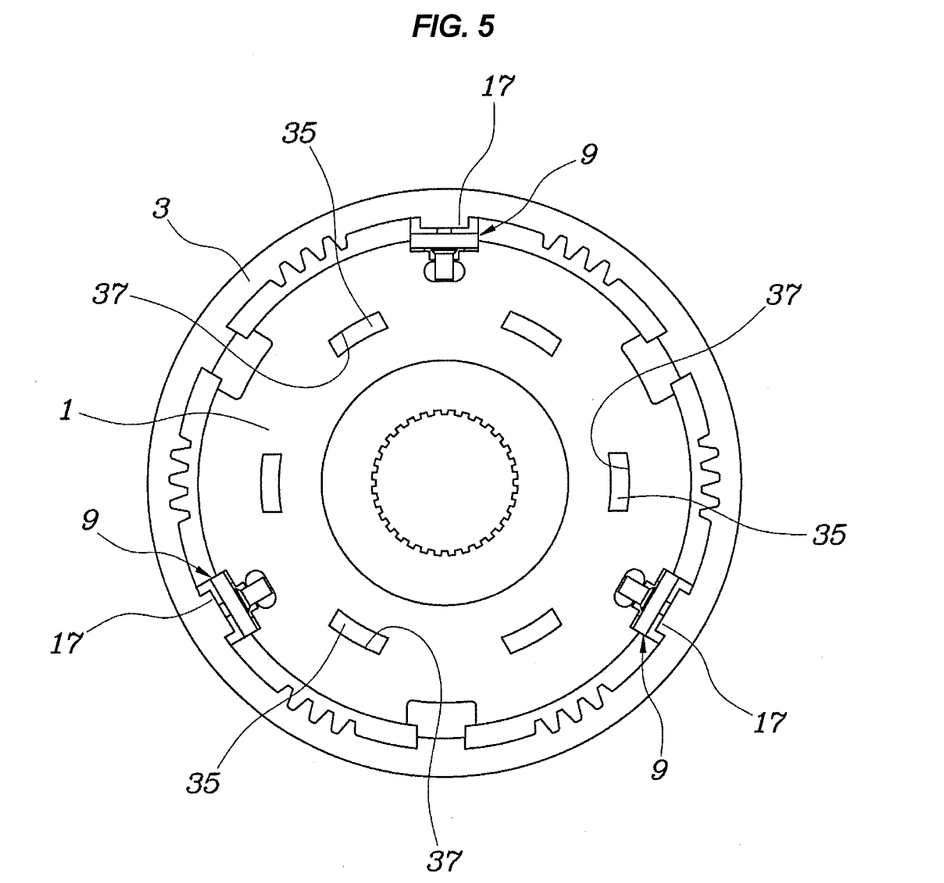
FIG. 5 is a diagram illustrating the hub and the sleeve of FIG. 1 viewed from an opposite side of a clutch gear.
Figure 6:
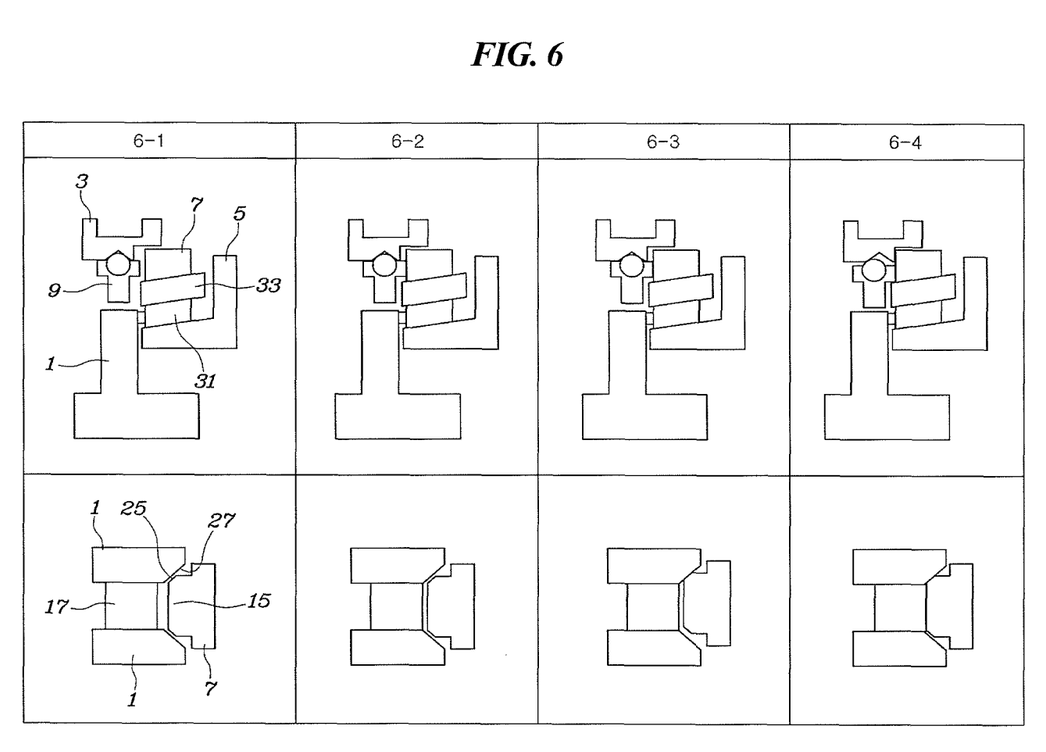
FIG. 6 is a diagram for describing an action of the present invention.

FIG. 6 illustrates a process of changing a basic state in which the clutch of the present invention configured as described above does not transfer the torque to a state in which the torque is gradually transferred, in which each of the upper and lower parts of FIG. 6 illustrates the same state and the upper part illustrates the cross section state as illustrated in FIG. 2 and the lower part illustrates the cross section state as illustrated in FIG. 4.

A state 6-1 of the leftmost part of FIG. 6 is a basic state and the sleeve 3 is at a basic position where it never moves toward the clutch gear 5. At the present point, the key 9 and the sleeve 3 are in the state in which they do not contact the first friction ring 7.

The next state 6-2 is a state in which the sleeve 3 starts to move by the actuator and shows the moment that the sleeve 3 does not yet contact the first friction ring 7 but the key 9 starts to contact the first friction ring 7.

In the next state 6-3, by a slight pressure of the key 9 applied to the first friction ring 7, the first friction ring 7 removes the oil film and the gap between the first friction surface 47, the second friction surface 49, and the third friction surface 51 while being slightly pressed toward the clutch gear 5 and the second inclined surface 27 of the first ring protrusion 15 contacts the first inclined surface 25 of the hub groove 13 but the sleeve 3 is not in contact with the first friction ring 7.

That is, the process from the state 1 to the state 3 is a process of removing the oil film and the gap between the first friction ring and the clutch cone 29 from the first friction ring 7 formed in the basic state to secure a friction coefficient from the first friction ring 7 to the clutch cone 29 which is originally considered at the time of the design of the clutch.

The next state 6-4 is a state in which the sleeve 3 further moves and thus directly contacts the first friction ring 7 to start the pressing. Substantially, from the present state, the size of the clutch transfer torque is controlled depending on the friction coefficient at the time of the design in response to the force applied to the sleeve 3.

Therefore, the appropriate clutch transfer torque meeting the design intention may be controlled by the operation of the actuator to improve the control precision and the transmission performance of the transmission.

Figure 7:
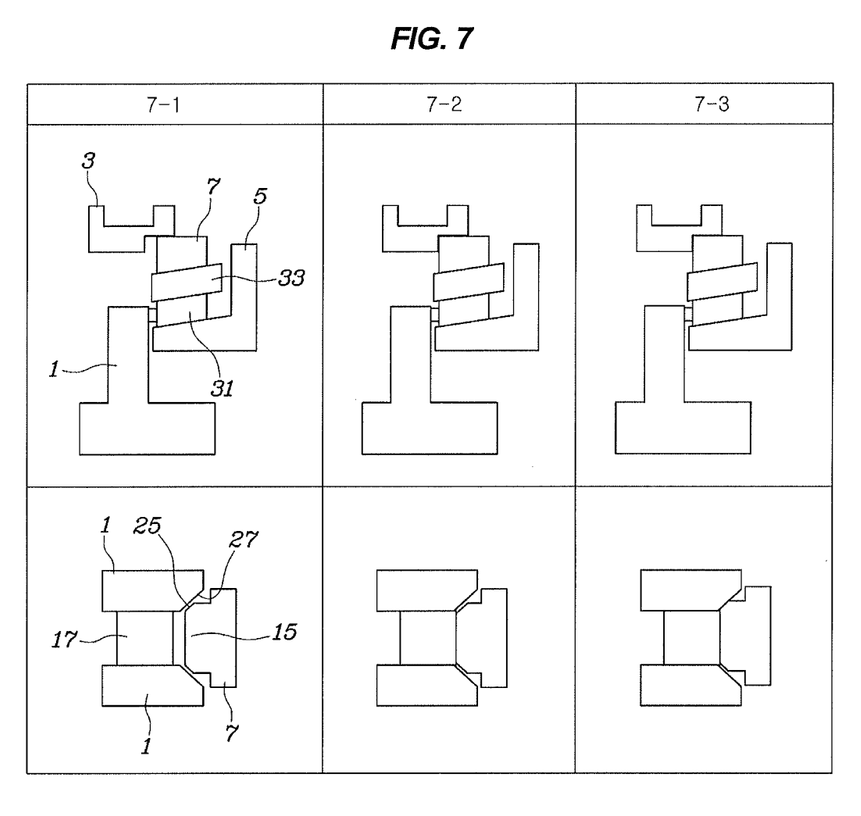
FIG. 7 is a diagram for describing an example in which a key is removed from the exemplary embodiment of the present invention.

When there is no key 9 according to an exemplary embodiment of the present invention, the clutch is operated like the state as illustrated in FIG. 7. There is no change between the first friction ring 7 and the clutch cone 29 while the sleeve 3 starts to move from the basic state like the leftmost 7-1 and the sleeve 3 starts to contact the first friction ring 7 like 7-2. That is, the gap and the oil film between the first friction ring 7 and the clutch cone 29 remain as it is.

Therefore, as the sleeve 3 further moves, the first friction ring 7 removes the oil film and the gap between the first friction ring 7 and the clutch cone 29 and at the same time the friction force between the first friction ring 7 and the clutch cone 29 is suddenly increased nonlinearly from a very low state to a high state by the pressure provided from the sleeve 3, the contact between the first inclined surface 25 and the second inclined surface 27, and the additional pressure depending on the change in the rotation displacement to the straight displacement by the pressure in the rotation direction, wherein the clutch transfer torque is suddenly changed even in the state in which the size of the force applied by the actuator is constant making it is difficult to accurately control the clutch transfer torque by the actuator.

According to the exemplary embodiments of the present invention, it is possible to make the size of the clutch system as small as possible, transfer the relatively large torque, and very precisely control the clutch transfer torque by the actuator by occupying the relatively small volume and implementing the relatively large torque transfer capacity due to the simple and compact structure and relatively reducing the actuating force of the clutch required for the torque transfer to reduce the size and capacity of the actuator.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch apparatus, comprising:
   a hub configured to be constrained to a rotation shaft;
   a sleeve configured to be straight slidably disposed on an external circumferential surface of the hub;
   a clutch gear configured to be disposed to be relatively rotatable with respect to the rotation shaft;
   a first friction ring configured to be mounted between the clutch gear and the hub and pressed toward the clutch gear to form a frictional force between the clutch gear and the hub to transfer a torque;
   a key configured to be mounted between the sleeve and the hub and transfer a linear displacement of the sleeve to the first friction ring before the sleeve makes contact with the first friction ring; and
   a displacement changing portion configured to change a relative rotation displacement of the first friction ring with respect to the hub to an axial linear displacement of the first friction ring,
   wherein the hub is provided with a hub groove accommodating the key, the first friction ring is provided with a first ring protrusion being inserted into the hub groove, and an internal side of the sleeve is provided with a sleeve protrusion integrally formed on the internal side of the sleeve and inserted into the hub groove to press directly the first ring protrusion axially, and
   wherein the displacement changing portion includes:
   a first inclined surface formed, at an end part of the hub groove, facing toward the first friction ring, in a shape in which a width thereof is expanded along a circumferential direction of the hub groove; and
   a second inclined surface formed at the first ring protrusion of the first friction ring in parallel with the first inclined surface, to contact with the first inclined surface.

2. The clutch apparatus of claim 1, wherein the key includes:
   a support ball elastically supported toward the sleeve protrusion of the sleeve; and
   a key spring embedded to give an elastic force to the support ball,
   wherein an internal surface of the sleeve protrusion is provided with a sleeve groove wherein a portion of the support ball of the key is configured to be inserted into the sleeve groove.

3. The clutch apparatus of claim 1, wherein the clutch gear is provided with a clutch cone that has an external diameter decreased while protruding toward the hub, and
   middle friction members are mounted between the first friction ring and the clutch cone wherein friction surfaces are formed to overlap each other.

4. The clutch apparatus of claim 3, wherein the middle friction members include:
   a second friction ring configured to have a limited rotation with respect to the hub and have an internal side contacting an external side of the clutch cone; and
   a middle cone configured to have a limited rotation with respect to the clutch gear and have an internal side formed to contact an external side of the second friction ring and an external side formed to contact the internal side of the first friction ring.

5. The clutch apparatus of claim 4, wherein the second friction ring is provided with a plurality of second ring protrusions protruding toward the hub and the hub is provided with a plurality of hub holes into which the second ring protrusions are inserted.

6. The clutch apparatus of claim 4, wherein the clutch gear has a structure in which a center of the clutch gear is provided with a flange portion, an opposite side of the hub is provided with a gear portion based on the flange portion, and the hub is provided with the clutch cone based on the flange portion.

7. The clutch apparatus of claim 6, wherein the middle cone is provided with middle cone protrusions protruding toward the flange portion and the flange portion is provided with a plurality of flange holes into which the middle cone protrusions are inserted.

* * * * *